United States Patent [19]

Ort

[11] Patent Number: 5,277,072
[45] Date of Patent: Jan. 11, 1994

[54] DEVICE FOR MEASURING A FORCE CAUSING TENSILE STRESS IN A THREAD

[75] Inventor: Werner Julius Ort, Darmstadt, Fed. Rep. of Germany

[73] Assignee: Hottinger Baldwin Messtechnik GmbH, Darmstadt, Fed. Rep. of Germany

[21] Appl. No.: 796,700

[22] Filed: Nov. 21, 1991

[30] Foreign Application Priority Data

Nov. 22, 1990 [DE] Fed. Rep. of Germany ....... 4037065

[51] Int. Cl.$^5$ .............................................. G01D 3/04
[52] U.S. Cl. .................................................. 73/862.632
[58] Field of Search ............... 73/774, 862.53, 862.541, 73/862.621, 862.625, 862.627, 862.629, 862.632, 862.633, 862.634, 862.636–862.639; 177/211; 338/4–6.47

[56] References Cited

U.S. PATENT DOCUMENTS

| | | |
|---|---|---|
| T934,002 | 5/1975 | Trail, Jr. . |
| 3,280,623 | 10/1966 | Saxl . |
| 3,878,711 | 4/1975 | Randolph, Jr. ................... 338/6 |
| 3,992,933 | 11/1976 | Randolph, Jr. ............ 73/862.639 |
| 4,233,837 | 11/1980 | Canfield . |
| 4,362,218 | 12/1982 | Shoberg ............................ 177/211 |
| 4,548,085 | 10/1985 | Grundy . |

FOREIGN PATENT DOCUMENTS

| | | |
|---|---|---|
| 0388879 | 9/1990 | European Pat. Off. . |
| 1573952 | 4/1970 | Fed. Rep. of Germany . |
| 3408497 | 9/1984 | Fed. Rep. of Germany . |
| 671829 | 9/1989 | Switzerland . |
| 323282 | 1/1930 | United Kingdom . |
| 441164 | 1/1936 | United Kingdom . |
| 1058018 | 2/1967 | United Kingdom . |

*Primary Examiner*—Robert Raevis
*Attorney, Agent, or Firm*—W. G. Fasse

[57] ABSTRACT

A force that causes tensile stress in a thread must be measured, for example in the textile industry, to avoid overstretching of the thread. Thus, small thread tensions must be maintained for many threads moving at high speeds. For this purpose a device for measuring thread tensions up to about 0.1 N (Newton) has a rod type metal component, one end of which forms a mounting member while the other end forms a thread engaging lever arm connected to the mounting member by a flat leaf spring carrying at least one strain gage. The lever arm is, e.g., conically tapering away from the leaf spring and carrying a thread engaging cylinder or extension at its end remote from the leaf spring. The signal provided by the strain gage is proportional to the force. The device forms a thread tension sensor having an eigenfrequency of about 3 kHz for measuring tensile stress on threads travelling at high speeds.

16 Claims, 2 Drawing Sheets

;
DEVICE FOR MEASURING A FORCE CAUSING TENSILE STRESS IN A THREAD

FIELD OF THE INVENTION

The invention relates to a device for measuring a force causing tensile stress in a thread or in a rope. Such devices are used, for example, for sensing the tension in textile threads that are being wound onto or off supply spools. Accordingly, the device is referred to as a thread tension sensor.

BACKGROUND INFORMATION

When threads are processed or used up, especially in the textile industry, it is frequently important to accurately maintain predetermined thread tensions, for example, to assure the weaving of a textile fabric having a uniform appearance. For this purpose it is necessary to continuously measure or sense the thread tension to quickly recognize any deviations from a rated thread tension so that corrections can be made, for example, by means of a respective closed loop control mechanism for returning the thread tension to the desired rated value. In this context, the thread tensions are rather small, for example, the thread tensions may be smaller than 0.1 N (Newton). Measuring these small tensions accurately has posed a problem in the past.

Furthermore, the threads are usually travelling at substantially high speeds as they are being processed or used, whereby the respective thread tension sensors must have relatively large natural frequencies up to about 3 kHz. Textile machines, such as high speed looms, handle simultaneously a substantial number of threads that may exceed more than 100 threads. Measuring individually the thread tension for each of these threads has posed a space problem for locating the respective large number of thread tension sensors. Accordingly, it is desirable to construct these sensors as compact as possible and also as a mass produceable item at low cost. Yet, the inexpensive sensors shall be able to make precision measurements. Such requirements are not necessarily compatible with each other.

It might be possible to measure the thread tension by means of a spring balance which is connected to an electrical circuit for converting a spring deflection of the balance into a corresponding electrical signal which would then have to be evaluated. For this purpose, it is possible to suspend a thread guide roller from the spring balance which would thus provide a measure for the thread tension. However, such an arrangement has its problems because, the tension to be measured is relatively small, namely less than 0.1 N as mentioned above. The measuring of such small forces would require very soft springs. The respective spring mass system has, as a rule, a very low natural frequency so that such a device would be suitable only for measurements on stationary or very slow moving threads.

OBJECTS OF THE INVENTION

In view of the above it is the aim of the invention to achieve the following objects singly or in combination:

to provide a compact thread tension sensor capable of measuring small thread tensions on threads running at high speeds and to measure these tensions accurately;

to construct the sensors sufficiently small that they can be placed at any desirable thread guide location;

to construct the sensors so that they can be used for retrofitting conventional textile machines;

to provide a thread tension sensor capable of measuring relatively small tension loads with high precision;

to provide a sensor that does not comprise any components that are subject to wear and tear, or to at least keep wear and tear to a minimum;

to provide a sensor capable of measuring short duration thread tensions that exceed a limit value so that from an accumulation of instances where the permissible thread tension has been exceeded, a conclusion regarding the thread quality can be made; and to equip the thread tension sensor with a limit stop to prevent its own destruction.

SUMMARY OF THE INVENTION

The thread tension sensor according to the invention, especially for measuring the tensile stress in threads, particularly textile threads and even ropes, is characterized in that a mounting member has secured thereto a flat leaf spring element which is equipped with at least one strain gage and which is connected to a bending stiff low mass lever arm which transmits the force that causes the tensile stress to the leaf spring element, whereby the lever arm is preferably long relative to an axial length of the flat leaf spring element.

The just described type of construction according to the invention makes the sensor very compact which in turn has the advantage that these sensors may be located in substantially any desired or required thread guide location, for example, where thread guide rollers were positioned heretofore. Further, it is now possible to locate such sensors in substantial numbers next to one another, which is especially required in textile weaving looms in which a substantial number of threads are guided in parallel, for example, the warp threads. Such sensors as disclosed herein are also suitable for installation in existing textile weaving looms without the need for a large structural effort.

Another advantage of the present thread tension sensors is seen in that the strain gage or a plurality of strain gages convert the measured force directly into an electrical signal which can especially be used in a bridge circuit of conventional construction when four strain gages are used, to thereby achieve a very precise, measured signal that can be well evaluated in conventional signal processing computer circuits. Another advantage of the present sensors is seen in that they have substantially no parts that are subject to wear and tear so that their useful life is quite substantial.

The present sensors are also advantageously suitable for ascertaining short duration tensile stress values that exceed a rated thread tension stress value. In this connection it is possible to store a number of thread tension values that have been measured at a relative high frequency, in the memory of a computer circuit, whereby the measuring takes place during a continuously progressing measuring cycle. A mean value is then formed from the measured values. Thus, it becomes possible to compare the instantaneously measured value with the mean value, as well as with an upper limit value and with a lower limit value. The comparing result is then also stored or used to provide a control or warning signal, whereby deviations from the mean value or excessive upper and lower limit values are used for the production of the control signal. This evaluation of the measured signal makes it possible to provide information for special thread productions regarding the thread quality of the particular production process.

Another advantage of the invention is seen in that the present sensors can be easily produced by applying simple milling operations to standard stock material, such as standard light metal rods made of aluminum or the like. Standard stock rods having a cross-sectional area of about 1cm$^2$ are suitable for the present purpose and the total needed length is only a few centimeters for each sensor. Recesses are milled into the standard stock rod from opposite sides so as to leave a narrow land between the recesses. The narrow land forms the above mentioned flat leaf spring element. A mounting member is left at one end of the rod and a lever arm is left at the other end of the rod. The lever arm is constructed so as to have as little mass as possible. For this purpose the lever arm is formed as a conical member which additionally may be hollow. The construction is such that the lever arm remains sufficiently stiff for the transmission of the tensile stress causing force from an outer free end of the lever arm to the flat leaf spring element. One or more, preferably four, strain gages are then secured to the flat leaf spring surface or surfaces and the electrical circuits are formed in a conventional manner.

In another embodiment according to the invention the above described sensor component comprising the mounting member, the leaf spring, and the lever arm, is enclosed in a housing, whereby especially the leaf spring carrying the strain gages is protected against adverse environmental influences. Additionally, the housing serves simultaneously as an overload stop which prevents the destruction of the sensor, for example, when the thread should have formed a knot or when the thread is otherwise stuck so as to exert an excessive pull on the sensor. The housing prevents this overloading of the sensor, especially the flat leaf spring.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
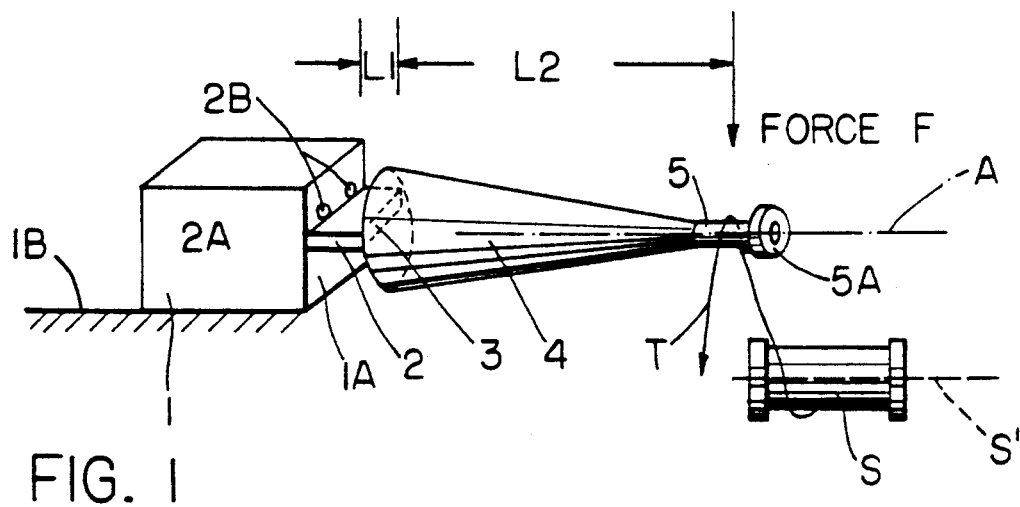
FIG. 1 is a perspective view of a thread tension sensor according to the invention.
Figure 1A:
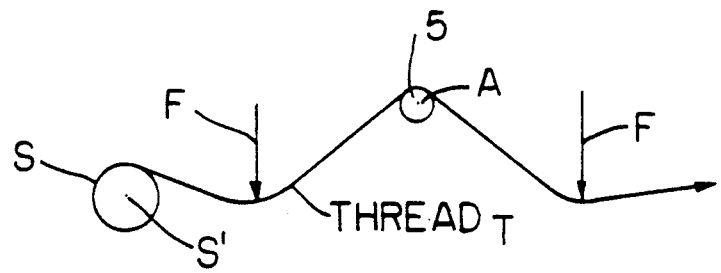
FIG. 1A is a schematic view of the thread path through the tension sensor.

FIGS. 1 and 1A show a thread tension sensor and the respective thread path with a mounting member 1 having, for example, a cuboid shape, a flat leaf spring element 2 secured to an end surface 1a of the mounting member 1. At least one, preferably more, strain gages 2a with electrical terminals 2b are bonded to the leaf spring 2, for example by an adhesive. The mounting member 1 is secured to a support 1b, such as a machine frame. A conical lever arm 4 is secured to the end 3 of the leaf spring 2 for transmitting a force F that causes a tensile stress in a thread T running over a thread contact extension 5 of the lever arm 4, for example, from a spool S having a rotational axis S'. A flange 5a is secured to at least the free end of the thread engaging extension 5 to prevent the thread T from running off the extension 5. Another flange may be provided where the extension 5 merges into the conical section of the lever arm 4. The lever arm 4 is hollow and conical to reduce its mass while still having sufficient stiffness for transmitting the force F to the leaf spring 2. The extension 5 serves as a thread guide.

The mounting member 1 has a cuboid, preferably cubic configuration with an axial length of about 5 mm. A longitudinal axis A extends centrally through the sensor. The mounting member 1 serves primarily for securing the sensor to a machine frame, such as symbolically shown at 1b. The leaf spring 2 may be bonded to the member 1 or it may be machined as an integral part of the member 1. The spring 2 is a thin sheet metal element having a length in the axial direction of about 1.5 mm and a width perpendicularly to the axial direction and horizontally corresponding to not more than 5 mm. The thickness of the spring 2 in the vertical direction can be less than 1 mm. The spring element 2 extends perpendicularly to the end surface 1a of the mounting member 1 approximately centrally thereof. Thus, the spring 2 extends substantially in parallel to the horizontal edges of the member 1. It is conceivable that the mounting member 1 itself is part of the machine frame, for example, of a textile machine such as a loom to which the spring element 2 is secured.

The lever arm 4 is secured with its large diameter end to the spring 2, for example, by adhesive bonding or as an integral part. The arm 4 is substantially longer in the axial direction of the axis A than the spring 2. A ratio of 1:20 is considered to be practical. As mentioned, the lever arm 4 is preferably made of a light metal, such as aluminum having a small modulus of elasticity. The thread contact extension 5 is preferably cylindrical. The mass of the arm 4 should be as small as possible, yet it must be stiff enough for the above mentioned transfer of the force to the spring 2 The conical shape of the lever arm 4 is preferred because the bending moment caused by the force F diminishes toward the right-hand end of the sensor. As a result, the mass may also diminish toward the force introduction end. The lever arm does not have to be made of light metal. Other materials, such as fiber composites, would be suitable for the present purposes. Further, the arm 4 does not need to be conical, nor does it need to be hollow. A cylindrical rod or a cylindrical tubular member could be used for the lever arm 4.

Figure 2:
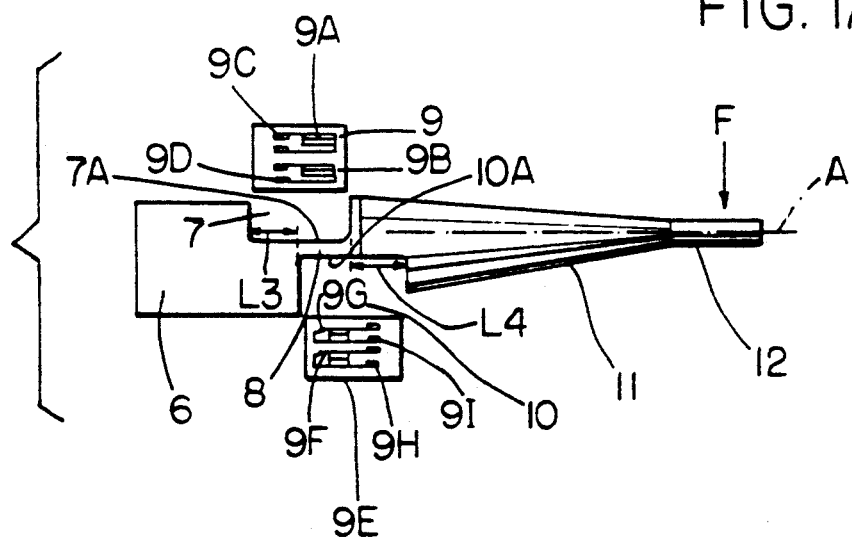
FIG. 2 is a side view of a thread tension sensor made of a standard stock light metal rod into which axially displaced recesses have been milled to form the flat leaf spring element and to provide space for the application of the strain gages also shown in FIG. 2.

Even in the embodiment of FIG. 2 it is preferred that the mounting member 1, the spring 2, and the lever arm 4 with its extension 5 are constructed as one integral component made of a light metal. Aluminum and aluminum alloys are particularly suitable for the spring material, since they have a small modulus of elasticity. Additionally, these aluminum alloys are readily machinable and also permit forming the lever arm 4 with a small mass.

The spring element 2 is preferably equipped with miniature strain gage elements 2a which are preferably bonded to the upwardly and downwardly facing surfaces of the spring 2. In order to obtain a measured signal as large as possible from a strain caused in the spring 2 by the force F, which strain is as small as possible, it is preferred to use four active strain gage elements 2a on the spring. Two elements would be applied to the top surface and two elements would be applied to the bottom or downwardly facing surface of the spring 2. Electronic evaluating circuit are connected to the terminals 2b. Such circuits are conventional and hence not shown. These circuits process and evaluate the signals provided at the terminals 2b of the strain gages in a conventional manner.

The cylindrical extension 5 of the lever arm 4 in effect constitutes a thread guide roller around which the thread may form a loop for introducing the force F into the lever arm 4. Care will be taken, that the travel direction of the thread T is in the direction of the required force application. The direction of the required force application depends on the direction in which the leaf spring 2 must be bent in order to introduce strain caused signals into the strain gage elements 2a. However, it is an advantage of the invention that the present sensors can be mounted with the mounting member 1 with due regard to the thread travel direction, for example, required in a loom.

The electrical signal generated by the strain gage elements 2a is proportional to the force F so that the further signal processing is correspondingly simple. The length of the lever arm 4 will be selected with due regard to the size of the available force F and with regard to the dimensions of the spring element 2. For a construction that is as compact as possible, the spring element 2 should be as short as possible. However, the spring element 2 must be at least long enough to accommodate the length of a strain gage element 2a, at least a microstrain gage element. In order to make it possible to measure the respective forces, or rather the strain caused thereby, at high thread travel speeds, it is necessary that the spring stiffness and thus the thickness of the spring elements and the mass of the lever arm 4 are optimally selected. As mentioned above, a spring length of 1.5 mm would call for a lever arm length of about 30 mm. Such sensors will reach eigenfrequencies up to 3 kHz when the applied forces are about 1 N.

FIG. 2 illustrates an embodiment in which the individual elements of the sensor component have been machined out of a standard light metal rod to form a mounting member 6 and a lever arm 11 by milling recesses 7 and 10 into the rod from opposite sides relative to the longitudinal axis A. The depth of the recesses 7 and 10 is such that a land 8 remains to form the spring element. The present recesses 7 and 10 are axially displaced relative to each other so that the overlap is only partial to form the spring 8. The standard rod may have a circular cross-section and is made of aluminum alloy. The depths of the recesses 7 and 10 are the same perpendicularly to the longitudinal axis A so that a symmetrical arrangement results The lever arm 11 with its thread engaging extension 12 is also formed from the same standard rod. Preferably, the lever arm 11 is milled to have a conical tapering toward the thread engaging extension 12. If desired, the thread engaging extension 12 may also be provided with a thread retaining flange as shown in FIG. 1.

A strain gage 9 carrying two strain gage elements 9a and 9b with respective electrical terminals 9c and 9d is bonded to the surface 7a so that the strain gage elements 9a and 9b are located in the overlap portion forming the leaf spring 8 while the terminals 9c and 9d are located on the surface portion that reaches onto the mounting member 6. Similarly, a strain gage 9e with strain gage elements 9f and 9g is secured to the spring surface 10a with the electrical terminals 9h and 9i extending onto the surface portion that forms part of the lever arm 11. By overlapping the two recesses 7 and 10 only partially in the axial direction, it is possible to make the effective length of the leaf spring 8 as short as possible and still provide space for the electrical terminals of the strain gage elements. This feature has the advantage that no attention needs to be paid to the fact that the backing or substrate of the strain gage elements frequently is rather brittle and hence cannot be bent around the corner. By selecting the overlap so that its length corresponds to the length of the gage portion of the strain gages, an optimally short length for the spring 8 is achieved. Additionally, by pointing the gage terminals in opposite directions as shown in FIG. 2, a very short spring element 8 is achieved that has optimal measuring characteristics and provides simple connecting possibilities for the electrical conductors that must be electrically connected to the terminals 9c, 9d, 9h, and 9i. Besides, the just described embodiment can be mass produced on automatic milling machines so that its production is rather simple and cost effective.

In operation, the thread T introduces a force into the lever arm 4, 11 which bends downwardly as indicated by the arrow F, thereby applying a bending stress to the spring element 2, 8. As a result, the electrical resistance changes in the strain gages 2a, or 9a and 9e. The resulting electrical signal is supplied for further evaluation to a computer circuit not shown and the output is proportional to the force measured.

Figure 3:
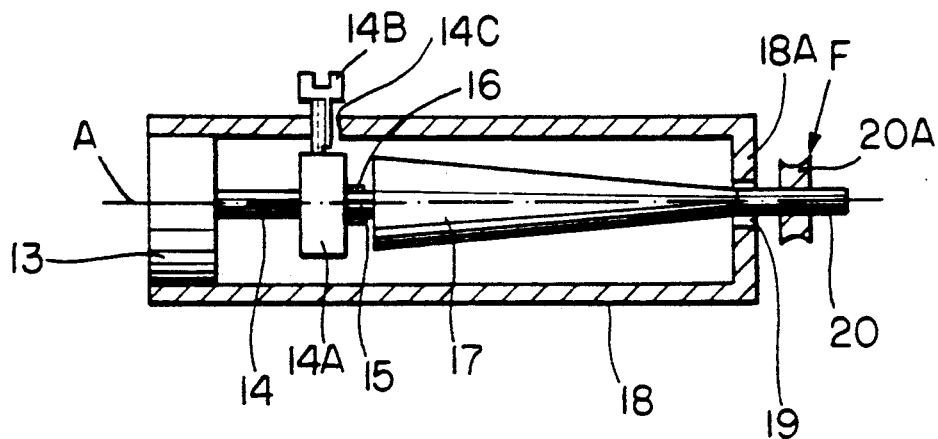
FIG. 3 shows a further modified embodiment, partially in section, in which the sensor is mounted in a housing that forms an overload stop against excessive excursions of the sensor and which is provided with a spring bias adjustment.

FIG. 3 shows an embodiment quite similar to that of FIG. 1 with a housing 18 that is preferably cylindrical, but also may have a square or rectangular cross-section. The housing 18 has an open end in which the mounting member 13 is mounted to form a closure for the housing. The other housing end has an end wall 18a with an axial bore 19 having an internal diameter somewhat larger than the outer diameter of the thread engaging end 20 that extends through the bore 19 out of the housing 18 and preferably carries a thread guide roller 20a. The inner diameter of the axial bore 19 is so selected that it provides a limit stop for the maximally permitted deflection of the lever arm 17.

The inner diameter of the housing 18 is selected relative to the outer diameter of the mounting member 13 to provide a location fit for the mounting member 13. Additionally, the housing has a threaded bore 14c in which a screw 14b is received to provide a limit stop for a connector 14a which connects the leaf spring 15 carrying the strain gages 16 with a further spring 14 connected in turn to the mounting member 13. The screw 14b extends perpendicularly to the longitudinal axis A of the sensor.

The bore 19 functioning as a maximum deflection stop, and the screw 14b are both desirable for protecting the strain gages 16 on the leaf spring 15. The bore 19 prevents the transmission of excess bending moments to the strain gages 16, for example, when a knot in the thread or other thread stops would cause a deflection which is several times as large as a normal deflection caused when the thread runs normally through the thread guide roller 20a. The second spring 14 also provides a protection for the strain gages. For this purpose, the second spring 14 is connected to the first or sensing spring 15 through the above mentioned connector 14a which is preferably also cylindrical and provides a stop for the adjustment screw 14b. The sensor spring 15 is arranged between the connector 14a and the lever arm 17. Strain gages 16 are secured to the spring 15 in the same manner as described above. In order to provide for the above mentioned desirable very large eigenfrequencies of about 3 kHz, the sensor or leaf spring 15 is rather stiff, whereby the normal deflection of the extension 20 is very small. As a result, it is difficult to provide a precise inner diameter for the axial bore 19 functioning as an overload limit stop. In other words, the air gap between the surface of the extension 20 and the surface of the bore 19 would have to be a fraction of a milimeter. In order to avoid such high precision drilling, the second spring element 14 is provided which has a softer spring stiffness than the sensor or leaf spring 15. The screw 14b is adjusted to provide a spring bias for the further spring element 14 to such an extent that the cylindrical connector 14a deflects only away from the inner end of the screw 14b when the rated load applied to the extension 20 of the lever arm 17 is exceeded. In that case, the lever arm 17 is deflected until it contacts the inner wall of the bore 19 which thus provides a limit stop. Due to this construction the diameter of the bore 19 is not critical so that a substantially larger air gap can be provided than would be necessary without the connector 14a and the adjustment screw 14b. This feature is due to fact that the second spring 14 is softer than the sensing leaf spring 15 so that when the rated load is exceeded, only the spring element 14 is deformed, but not the spring element 15, whereby a destruction of the strain gages 16, due to an excessive bending of the spring 15 is avoided.

Figure 4:
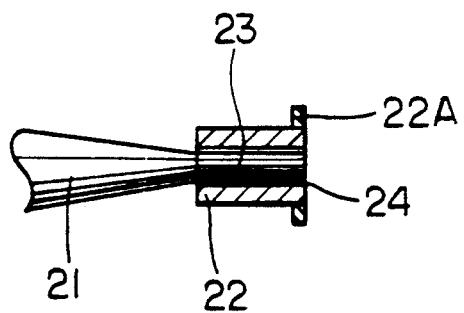
FIG. 4 shows an end portion of a lever arm of the present sensor equipped with a hard material thread contact bushing.

FIG. 4 shows a construction of a thread engaging extension 23 of a lever arm 21 with a hard material thread engaging bushing 22 that is, for example, glued to the extension 23 by a thermoplastic adhesive 24. The bushing 22 may, for example, be a tubular section made of ceramic which is resistant a the wear and tear caused by a thread running over the surface of the bushing 22. The bushing 22 may also be provided with a flange 22a to keep a thread from running off the bushing. The hard material of the bushing keeps wear and tear caused by the thread to a minimum.

The use of a thermoplastic adhesive 24, as mentioned above, has the advantage that the ceramic bushing 22 can easily be replaced by heating up the bushing without dismounting the entire sensor. Where larger thread tensions are to be measured it would be preferable to use a roller 20a as shown in FIG. 3 that rotates relative to the extension 20.

The present sensor is suitable for measuring a wide range of thread tensions, whereby the respective dimensions of the sensor can easily be adapted to the particular purpose, for example, for measuring the tension in thick threads, ropes, or other fibers having high tension loads. Further, the present sensor is applicable even for very large thread travel speeds.

Although the invention has been described with reference to specific example embodiments it will be appreciated that it is intended to cover all modifications and equivalents within the scope of the appended claims.

What I claim is:

1. A device for measuring a force causing tensile stress in a thread, comprising a flat leaf spring having a first end and a second end, a mounting member for securing said first end of said flat leaf spring to a support, at least one strain gage secured to said flat leaf spring, a thread engaging lever arm which is stiff against bending secured to said second end of said flat leaf spring for transmitting said force to said flat leaf spring, said flat leaf spring, said mounting member, and said lever arm having a common longitudinal axis, said flat leaf spring having a first length in the direction of said longitudinal axis, said lever arm having a second length in the direction of said longitudinal axis, such that said second length is substantially longer than said first length, and wherein at least said mounting member comprises a first recess on one side and a second recess on the other side of said mounting member, said first and second recesses being displaced relative to each other in the direction of said common longitudinal axis so that said recesses form an overlap having an axial length sufficient to form said leaf spring, said recesses further having an axial length sufficient to provide at least one non-overlapping surface area for mounting electrical connections of said at least one strain gage.

2. The device of claim 1, wherein said second length is about twenty times longer than said first length.

3. The device of claim 1, wherein said mounting member, said flat leaf spring, and said lever arm are made of a light metal as one integral component, said light metal having a small modulus of elasticity.

4. The device of claim 1, wherein said mounting member has a cuboid configuration with flat surfaces including a spring support surface from which said first end of said flat leaf spring extends perpendicularly to said spring support surface, said flat leaf spring forming a flat rectangular leaf spring said second end of which is secured to a portion of said lever arm, whereby said spring support surface of said cuboid configuration and said portion of said lever arm normally extend in parallel to each other.

5. The device of claim 4, wherein said lever arm has a conical configuration and wherein said lever arm portion has the largest diameter of said conical configuration, said largest diameter corresponding to a width of said flat leaf spring.

6. The device of claim 1, wherein said flat leaf spring has a length and a width just sufficient for providing an attachment surface for said strain gage or strain gages.

7. The device of claim 1, further comprising a housing enclosing said mounting member, said flat leaf spring, and said lever arm, said mounting member being secured to said housing, said housing having an end wall with an axial bore through said end wall, said lever arm having a thread contact extension extending out of said housing through said axial bore, said thread contact extension of said lever arm having an outer diameter smaller than an inner diameter of said axial bore to permit a deflection of said lever arm by said force, said axial bore forming an overload stop for said device.

8. The device of claim 1, wherein said housing is cylindrical, said mounting member also having a cylindrical configuration fitting into one end of said cylindrical housing to form a closure of said cylindrical housing, said thread contact extension of said lever arm also having a cylindrical shape extending out of said axial bore in said housing end wall opposite said closure.

9. The device of claim 1, wherein said lever arm has a thread engaging extension at an end remote from said flat leaf spring, said device further comprising thread guide means on said thread engaging extension, and means for releasably securing said thread guide means to said extension.

10. The device of claim 9, wherein said thread guide means comprise a cylindrical ceramic bushing secured on said extension.

11. The device of claim 10, wherein said ceramic bushing has a radially extending flange at its end remote from said flat leaf spring, said flange keeping said thread from running off said extension.

12. The device of claim 1, wherein said lever arm is hollow to keep its mass low.

13. The device of claim 1, wherein said lever arm has a thread engaging extension and a radially extending flange on said extension remote from said flat leaf spring for keeping said thread from running off said extension.

14. The device of claim 1, wherein said lever arm has a thread engaging extension remote from said flat leaf spring and a thread guide roller rotatably supported on said extension.

15. The device of claim 1, wherein said mounting member, said flat leaf spring, and said lever arm form an integral structure having a mass sufficiently low for an natural frequency of about 3 kHz.

16. The device of claim 1, wherein said first recess is provided only in said mounting member, wherein said second recess is provided in said mounting member and in said lever arm, and wherein at least said non-overlapping surface area is located on said mounting member, while another non-overlapping surface area is provided on said lever arm.

* * * * *

UNITED STATES PATENT AND TRADEMARK OFFICE
CERTIFICATE OF CORRECTION

PATENT NO. : 5,277,072
DATED : Jan. 11, 1994
INVENTOR(S) : Werner Julius Ort

It is certified that error appears in the above-identified patent and that said Letters Patent is hereby corrected as shown below:

Column 8, line 58, replace "1" by --7--.

Signed and Sealed this

Seventeenth Day of May, 1994

Attest:

BRUCE LEHMAN

*Attesting Officer*  *Commissioner of Patents and Trademarks*